Patented Jan. 13, 1931

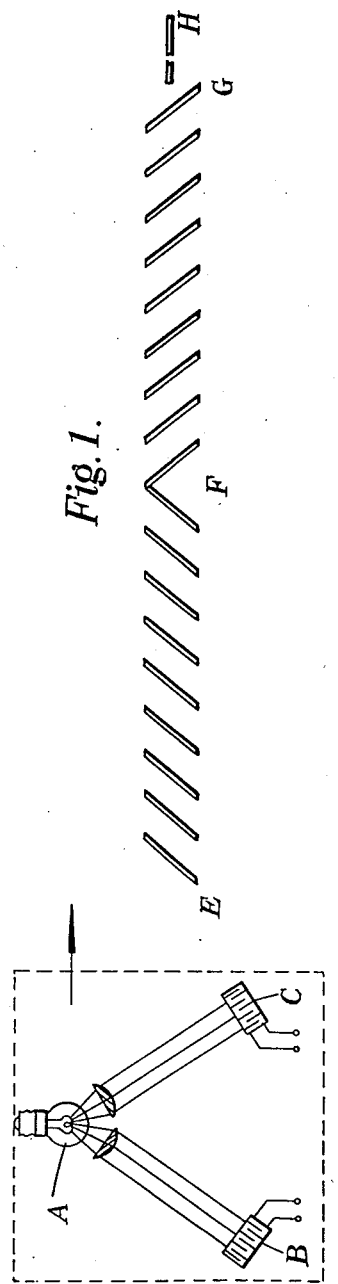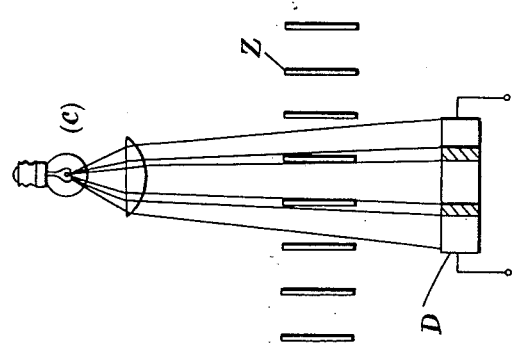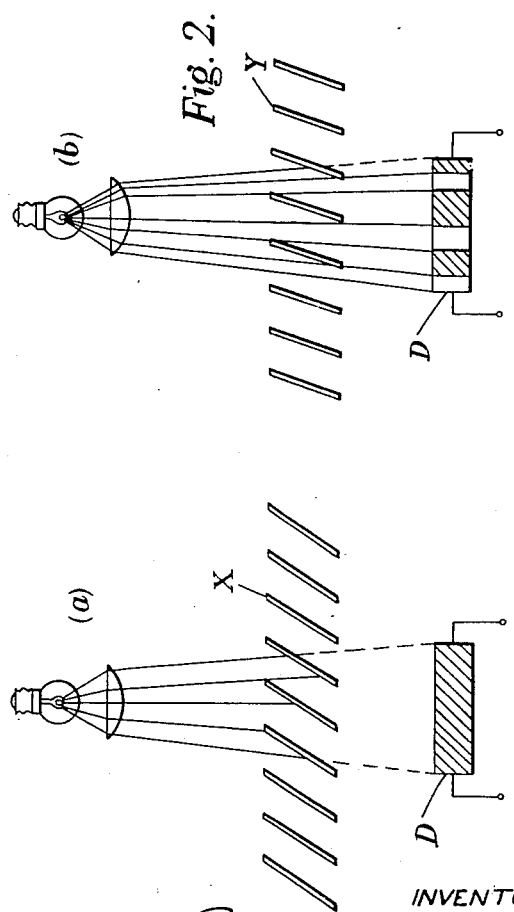

1,789,230

UNITED STATES PATENT OFFICE

PETER ST. JOHN HEATON, OF EARL'S COURT, LONDON, ENGLAND, ASSIGNOR TO RADIO-VISOR FOREIGN & COLONIAL LIMITED, OF LONDON, ENGLAND, A CORPORATION OF GREAT BRITAIN

METHOD OF CONTROLLING THE ILLUMINATION OF LIGHT-SENSITIVE BRIDGES

Application filed November 16, 1929, Serial No. 407,737, and in Great Britain November 17, 1928.

This invention relates to means for controlling the illumination of light sensitive cells and the like.

The invention is mainly applicable to cases where it is desired that a plurality of functions shall be performed by means of light sensitive devices and light controlling means. According to the invention I provide a source or sources of illumination, light sensitive cells to be illuminated from the sources or source of illumination, and direction means for controlling the illumination or otherwise of the cells. These selective controls may be obtained during a relative motion between the said light sensitive devices and light controlling means. The invention may also be employed in cases where no relative motion takes place between the units, the control being then obtained by the alteration of the directional characteristics of the light controlling means.

According to the invention I provide a source or sources of illumination arranged to throw one or more beams of light in a definite predetermined direction. In the path of these beams I provide one or more light sensitive devices, according to the number of functions it is desired to perform, and some form of directional light controlling means.

This light controlling means may take the form of a compound screen consisting of a number of slats arranged to allow light to pass through their interstices in a predetermined direction only, the direction depending upon the angular disposition of the slats. By a suitable arrangement of the angle of these slats for any given screen or portion of screen, light is allowed to fall on any desired light sensitive device or portion of same.

The invention will now be described by way of example only with reference to the accompanying drawings in which:—

Fig. 1 represents the invention as applied by means of a light interrupter having fixed slats, relative motion taking place between the light sensitive units and the interrupter.

Fig. 2 represents a modification of the above arrangement wherein a single light sensitive cell is employed and the illuminated area varied.

Referring now to Fig. 1 A is a lamp provided with optical means for the normal illumination of the two light sensitive cells B and C. The interrupter blade EH which is shown in three different forms by sections EF, FG and GH has movement relative to the lamp and light sensitive cells. Normally, that is in the absence of the interrupter, the cells B and C are illuminated, but on the passage of the section EF between A and B, C, light will be cut off from C, but the illumination of B will be unaffected. On further movement taking place and the section FG becoming operative, light will be cut off from B but illumination of C will take place. When the section GH becomes operative light will be cut off from both B and C.

It is therefore possible by varying the inclination and spacing of the slats to influence any given light sensitive cell or cells at will, and perform any predetermined function. The invention may be suitably applied to railway signalling and control, where it is desired either to perform from a stationary location, various functions on a moving locomotive, such as half and full brake application, warning at the approach to points, stations, etc., these functions being performed by means of different forms of screen as above described situated on the permanent way, and an arrangement of lamps and light sensitive devices fixed in a suitable position under the locomotive. Conversely where it is desired to give some definite distinguishing signal to be recorded at a fixed point, relative to the moving body, the process may be reversed, i. e. the interrupter is situated upon the moving body and the lamps and light sensitive devices are stationary.

Referring now to Fig. 2 a single light sensitive cell D and lamp A are shown in relation to three different forms of screen X, Y and Z in which the slats are equally spaced but at different angular inclinations to the axes of the screen. Fig. 2 (a) shows the interposition of the screen X which has the effect of cutting off all the light falling on light sensitive cell D. Fig. 2 (b) shows the interposition of screen Y cutting off a portion of light on D and Fig. 2 (c) shows screen Z allowing practically all the light from A to fall on D. By employing a screen with graduated slat inclination a progressive variation of illumination on D may be obtained.

Figure 3:
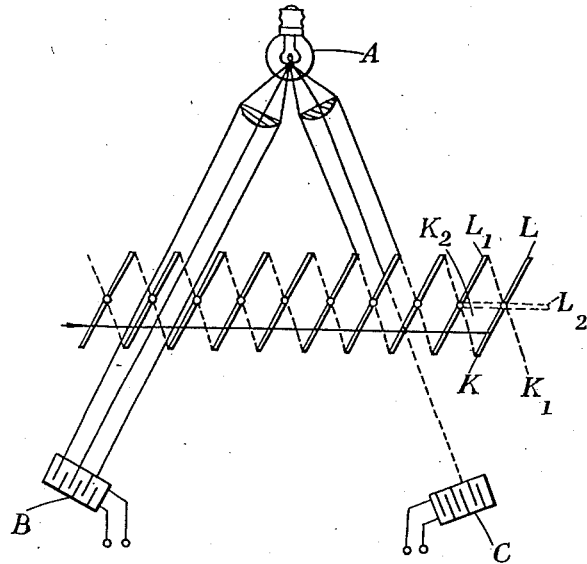
Fig. 3 represents the invention as applied by means of a light interrupter having movable slats.

Referring now to Fig. 3 the interrupter blade consists of slats so arranged that their inclination to the axis of the screen may be varied in unison. Thus when the slat K is in the position KL (the other slats being parallel) light is cut off from C, but not from B, whereas if the slats are changed to the position K1, L1, light is cut off from B, but not from C, if the further position K2, L2, is used, the effect of a plain interrupter blade is obtained and light is cut off from both B and C. This form of pivotal section blade may obviously be stationary between the lamp and the cells or may have movement relative to them as in the preceding figure.

Figure 4:
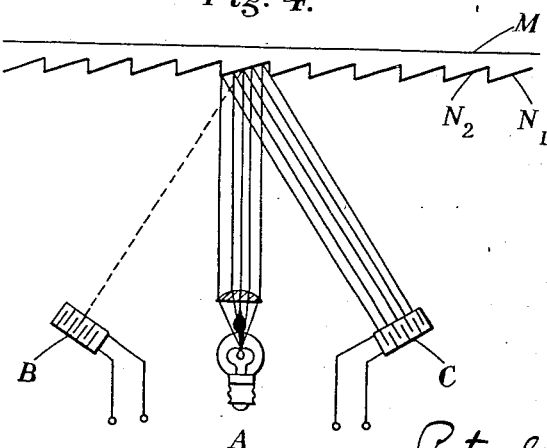
Fig. 4 is a further construction of the invention.

Referring to Fig. 4 an alternative form of screen M is shown whereby the same selective directional effect may be obtained as that given by the slatted screen shown in Figs. 1 and 2. The directional effect is obtained by means of small separate reflecting surfaces N1, N2, etc., inclined to the axis of the screen. This arrangement permits of the light sensitive devices and the source of illumination being situated on the same side of the screen; also the light sensitive cells are normally in darkness. These reflecting surfaces may be made adjustable in angle in the same manner as the slats previously mentioned with reference to Fig. 3.

I claim:—

1. A system for controlling the illumination of light-sensitive cells comprising a source of illumination, a light-sensitive cell adapted to be illuminated by said source of illumination, and a plurality of slats capable of movement relatively to said source of illumination and said light-sensitive cell, said slats being capable of being set in positions to vary the degree of illumination of said cell by said source of illumination.

2. A system for controlling the illumination of light-sensitive cells comprising a source of illumination, a plurality of light-sensitive cells adapted to be illuminated by said source of illumination, and a plurality of slats, relative movement being adapted to take place between said slats and said source of illumination and said light-sensitive cells, said slats being capable of being set in various relative positions so that on relative movement between the slats and source of illumination and light-sensitive cells taking place, the cells can be illuminated to various degrees of brightness.

3. A system for controlling the illumination of light-sensitive cells comprising a source of illumination, a plurality of light-sensitive cells adapted to be illuminated by said source of illumination, and a plurality of slats, relative movement being adapted to take place between said slats and said source of illumination and said light-sensitive cells, said slats being capable of being set in various relative positions so that on relative movement between the slats and source of illumination and light-sensitive cells taking place one of said cells is illuminated, whilst illumination is cut off from the other.

4. A system of controlling the illumination of light-sensitive cells according to claim 3, wherein said slats are in the form of reflecting surfaces.

In testimony whereof I have affixed my signature.

PETER ST. JOHN HEATON.